(12) United States Patent
Kapazi

(10) Patent No.: US 12,540,873 B2
(45) Date of Patent: Feb. 3, 2026

(54) DEVICE AND SYSTEM FOR CAPTURING AND PROCESSING PEDESTRIAN DATA

(71) Applicant: Joserli Perez Kapazi, Curitiba (BR)

(72) Inventor: Joserli Perez Kapazi, Curitiba (BR)

(*) Notice: Subject to any disclaimer, the term of this patent is extended or adjusted under 35 U.S.C. 154(b) by 272 days.

(21) Appl. No.: 18/548,503

(22) PCT Filed: Dec. 6, 2021

(86) PCT No.: PCT/BR2021/050537
§ 371 (c)(1),
(2) Date: Aug. 31, 2023

(87) PCT Pub. No.: WO2022/183261
PCT Pub. Date: Sep. 9, 2022

(65) Prior Publication Data
US 2024/0151599 A1    May 9, 2024

(30) Foreign Application Priority Data
Mar. 1, 2021   (BR) .......................... 1020210038608

(51) Int. Cl.
*G01L 1/20*  (2006.01)
*G01L 5/1623* (2020.01)

(52) U.S. Cl.
CPC ............ *G01L 5/1623* (2020.01); *G01L 1/205* (2013.01)

(58) Field of Classification Search
None
See application file for complete search history.

(56) References Cited

U.S. PATENT DOCUMENTS

| | | | |
|---|---|---|---|
| 8,966,997 B2 | 3/2015 | Stryker | |
| 9,833,142 B2* | 12/2017 | Horseman | A61B 5/002 |
| 9,949,640 B2* | 4/2018 | Horseman | A61B 5/1113 |
| 2015/0364059 A1* | 12/2015 | Marks | A61B 5/486 |
| | | | 482/9 |
| 2019/0350529 A1* | 11/2019 | Hayes | A61B 5/1118 |

FOREIGN PATENT DOCUMENTS

| | | | | |
|---|---|---|---|---|
| CA | 3130634 | | 8/2020 | |
| FR | 3068132 | | 8/2019 | |
| KR | 20200017778 | | 2/2020 | |
| KR | 20200072776 | | 6/2020 | |
| WO | WO2019193822 | | 10/2019 | |
| WO | WO-2019193822 A1 | * | 10/2019 | ............... G01L 1/20 |

* cited by examiner

*Primary Examiner* — Eric S. McCall
*Assistant Examiner* — Nigel H Plumb
(74) *Attorney, Agent, or Firm* — Defillo & Associates, Inc.; Evelyn A. Defillo

(57) ABSTRACT

A system for capturing and processing information from passers-by walking over a device equipped with stratified mechanical compression sensing, such as a mat or doormat, which is made up of a metal structure supporting a set of bars made of conductive polymer superimposed on the metal structure; such system is capable of managing a plurality of devices together.

3 Claims, 4 Drawing Sheets

DEVICE AND SYSTEM FOR CAPTURING AND PROCESSING PEDESTRIAN DATA

CROSS REFERENCE TO RELATED APPLICATION

This application is a National Stage Entry of PCT/BR2021/050537 filed Dec. 6, 2021, under the International Convention and claiming priority over Brazilian Patent Application No. BR 1020210038608 filed Mar. 1, 2021.

FIELD OF THE INVENTION

This innovation belongs to the monitoring and control systems field, more specifically a system for capturing information from passers-by using a stratified mechanical compression sensing device, such as a mat or doormat, which allows activating and controlling devices remotely.

BACKGROUND OF THE INVENTION

The generation of information from customers entering commercial establishments is of increasing interest in times where information gains value in business management.

Thus, knowing the customer is a factor of decisive importance, allowing the development of solutions more adequate to their needs and peculiarities.

The methods and devices currently used show difficulties that prevent their full use or adoption by entrepreneurs. Solutions based on video technologies, for example, demand a high investment, especially in the processing of generated information. The simplest solutions, on the other hand, use less refined devices, which limit the refining of the collected information and the consequent generation of significant data for the requester.

The association with the IoT technology to collect data, such as counting the number of passers-by, animals or objects walking over a device, and detect, by the morphology of their footprint, the direction of their displacement, estimating the size of that footprint and the resulting weight applied over such device, is something feasible and real in the technological scenario of initiatives that aim to develop customized or better adapted solutions to consumers.

With the data obtained, this connection allows the device to take direct command actions to other electronic devices integrated by a digital data network and send this data for storage and management on an associated data network server, through wireless data exchange technologies, such as Wi-Fi, Bluetooth, ESPNow or mobile networks such as 3G, 4G and others.

The system consists of at least one device, with the possibility of adding many other devices interconnected with each other and composing a single database, which can be connected to a network server.

Conceptually, the IoT (internet of things) is defined as a digital interconnection of everyday objects with the internet data network, that is, physical objects with embedded technology of sensors (image, sounds, temperature, humidity, pressure, magnetic or electrostatic fields, and other natural phenomena) as well as solenoids, tractors, mechanical handling systems, loudspeakers, image projection screens, lamps, appliances and machines, and other devices.

Thus, within an environment with electronic devices already communicating with each other in a relatively autonomous manner, not requiring the presence or intermediation of a person at the end of this communication chain, such as bank cards reading and operating machines, for example, the idea was to give to a mat or doormat these new features and many others from a database fed with information of the device itself.

The reception, storage, processing and distribution of data obtained by the readings from this IoT device is an integral part of the innovation solution proposed here.

These actions take place on one or more associated data network servers, dedicated or not, in something that can be called cloud computing, which is the on-demand availability of computing system resources, especially data storage and computing capacity, without direct user management. This way, many users, that is, IoT devices, such as many mats connected to the data network, have a data center that gathers the information received and processes it, making decisions, obtaining statistical data and distributing them, thus creating a business modeling, either by obtaining, storing, selling or renting this data.

Document U.S. Pat. No. 8,966,997 shows a pressure detection sheet with at least three layers, in which the first and third layers each have conductive paths separated by non-conductive spacers, the orientation of the conductive paths of the first layer is transversal to the orientation of the conductive paths of the third layer.

U.S. Pat. No. 9,833,142 discloses a system to monitor the employee's health, including the collection of biometric and biomechanical health data acquired through a plurality of sensors located in the workstation.

The teachings in U.S. Pat. No. 9,949,640 explain a system for detecting health characteristics of a user using a mat and a set of integrated sensors, including temperature, body position and body fat sensors, transmitting to a computer work station the health data corresponding to temperature, body position and body fat to determine the user's body temperature, body position and body fat.

The innovation proposed in US20190350529 brings a personal support device with sensors to monitor a person, capable of distinguishing between new and previous users of the support device, automatically zeroing an integrated scale system, distinguishing between objects and humans on the support device, determining whether a person is asleep or awake, monitoring and characterizing the person's levels of movement, recording probable events in relation to the device support surface, proposing identifications of objects added or removed from the support surface, recording power outputs and/or other purposes.

The description on US20150364059 shows a smart mat with sensors set to detect objects, which can transmit information from the sensor to a mobile component to determine the user's balance, weight distribution and posture adjustment, whereas the mobile component can store historical data associated with the user's activities.

The "People Counting Distance System—PCDS" product, available at https://www.bodvpressuremapping.com/people-counting/people-counting.html, is a mat to count people or available spaces and the distance between passers-by in order to allow a new entrance.

"Smart Mat", available for visualization on https://smartmat.com/special/, is a mat that senses the morphology of the applied compressions to map the user's movements.

Other similar solutions such as the "People Counting System By I-Trust Systems Dubai", available on https://youtu.be/8ABfftJDcTk; the "Instant counting mat", available on https://youtu.be/ZZIcWtZTBIU; or the "Conductive Textiles at Adafruit", available on https://youtu.be/m90-T8ov7TU, bring solutions that do not deal with the same data collection and treatment strategy for a device management system.

But the article "Construção e Validação de Tapete de Pressdo de Baixo Custo para Interação Humano-Computador", available on https://sol.sbc.org.br/index.php/svr_estendido/article/view/12952, describes a sensor mat with a mesh of sensors that is formed and interacts with the pressure exerted on the mat.

As can be seen, no reference mentions passers-by information collection and management system that uses a device with stratified mechanical compression sensing, such as a mat or doormat, composed of a metal bars structure set transversally to the displacement direction, which supports a set of conductive polymer pieces superimposed on the metal structure.

SUMMARY OF THE INVENTION

A system for capturing and processing information from passers-by walking over a device equipped with stratified mechanical compression sensing, such as a mat or doormat, which is made up of a metal structure supporting a set of bars made of conductive polymer superimposed on the metal structure; such system is capable of managing a plurality of devices together.

DETAILED DESCRIPTION OF THE INVENTION

Figure 4:
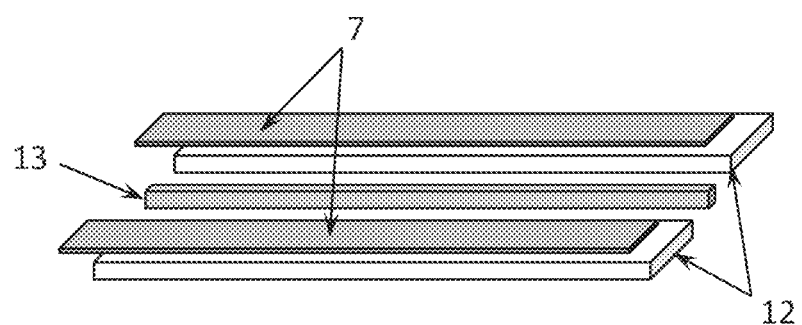
FIG. 4 schematically illustrates the preferred assembly arrangement of this innovation's device in an exploded view, where you can see the metal bar (12), the polymeric material ribbon (7) and the insulating separator (13).
Figure 5:
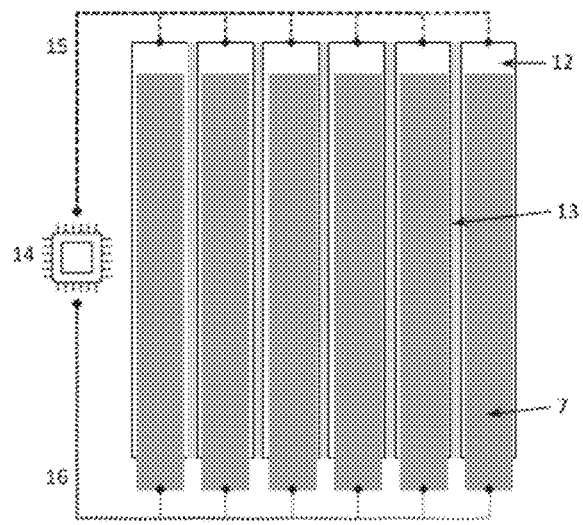
FIG. 5 schematically illustrates the connection arrangement of this innovation's device, where you can see the metal bar (12), the elastomeric material ribbon (7), the insulating separator (13), the electronic circuit (14), the connection with the bars (15) and the connection with the ribbons (16).

The innovation proposed herein consists of a system for collecting and managing information from passers-by (1) that uses a device (2) with stratified mechanical compression sensors, such as a mat or doormat composed of a set of metal bars structure (12) electrically isolated from each other by an insulating separator (13), and ribbons (7) made of an electrically conductive polymer individually superimposed on these metal bars (12), as illustrated in FIG. 4, where the bars (12) and ribbons (7) connect to an electronic circuit (14), as shown in FIG. 5.

Said electrically conductive polymer can be any that adapts to the use condition intended herein, such as conductive elastomers, which present variation in electrical resistivity due to mechanical compression.

This mat (2) is equipped with a malleable and resistant coating on its upper surface that provides support for passers-by (1) and protection to the polymeric ribbons (7), in addition to cleaning shoes and visual appearance desired for this type of product. Thus, finishes such as fabrics, synthetic or natural fibers, films, etc., can be considered as usable options.

The electronic circuit (14) comprises the association of a multiplexer/demultiplexer device (MUX/DEMUX), capable of converting the signals received from one of several data inputs to a single output, depending on the addressing inputs, or, in reverse, capable of addressing a single data input to one of several outputs, also depending on the addressing inputs.

Figure 6:
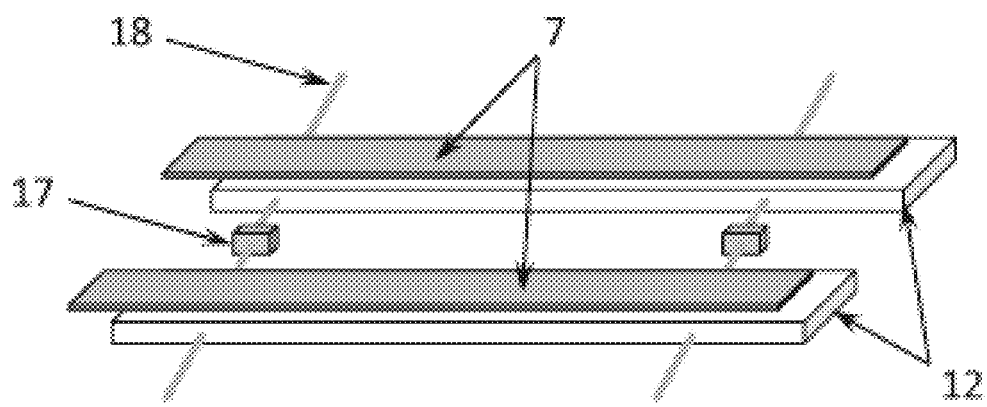
FIG. 6 schematically illustrates the alternative assembly arrangement of this innovation's device in an exploded view, where you can see the metal bar (12), the elastomeric material ribbon (7), the passing cable (18) and the separating element (17).

A preferred configuration of this innovation provides the use of connection elements between two adjacent bars (12), said element (13) consisting of a non-conductive material, which electrically isolates the adjacent bars (12), as illustrated in FIG. 4. In an alternative configuration, the bars (12) are joined together by a passing cable (18), coated with a non-conductive material, maintaining a separation element (17), also made of non-conductive material, in a separation position of the bars (12), as shown in FIG. 6.

Figure 8:
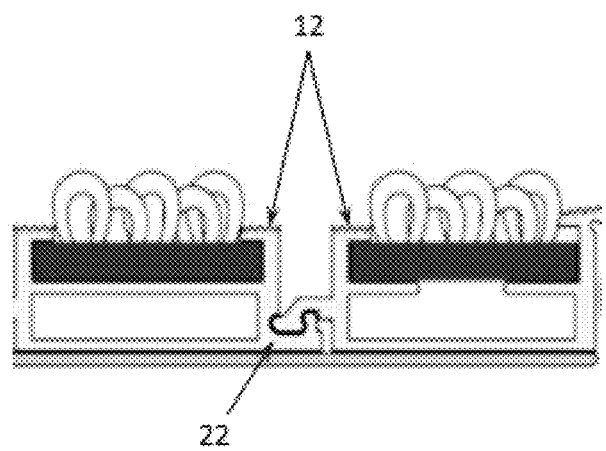
FIG. 8 illustrates the crimping configuration between the bars (12), where you can see the fit (22) between two adjacent bars (12).

An alternative configuration, shown in FIG. 8, comprises each metal bar (12) being partially coated with an insulating film, such as an anodizing layer or a plastic film, maintaining the electrical insulation between the two adjacent bars (12) and the crimping between these bars by a lateral fitting (22), of coincident conformation, so that the adjacent bars (12) are joined together while being kept electrically isolated.

These metal bars (12) are transversal to the expected displacement direction and the arrangement is able to collect signals from the mechanical compression applied on the device (2) when the passer-by (1) walks over the device (2), and process such signals, generating information (3), such as walking direction, the size of the foot (footprint) and the estimated body mass of the passer-by (1), to be sent to a network server (4) for data generation (5) in order to present them (6), and allow decision-making or activation or controlling the devices connected to this data network.

Also, this information (3) allows other devices to be activated (19), such as home appliances or industrial equipment, from the signal collected in the device (2).

This way, each of the bars (12) has an individual electrical connection (15) with the electronic circuit (14), in order to allow an electronic scan of the set, where each bar (12) is sensitized successively and the conductive polymer ribbon (7) receives this signal, varying its electrical conductivity according to the applied mechanical compression.

The system described herein consists of a physical device (2), such as a mat or a doormat, formed by a metal bar structure (12) and over each bar a (7) conductive polymeric material ribbon is placed, arranged transversely to the displacement direction, the bars (12) are joined together and kept electrically isolated by insulating separators (13, 17) and individually connected to an electronic circuit (14) that captures the generated signal and processes it, generating information (3) to be sent, through a wireless communication network, such as the internet or bluetooth, to a data network server (4), which receives the information (3) and processes it, generating data (5) about the passer-by (1), which can be used to configure customized solutions, or to an IoT device (19) which is activated by this information (3), so that it responds according to an established schedule.

Figure 1:
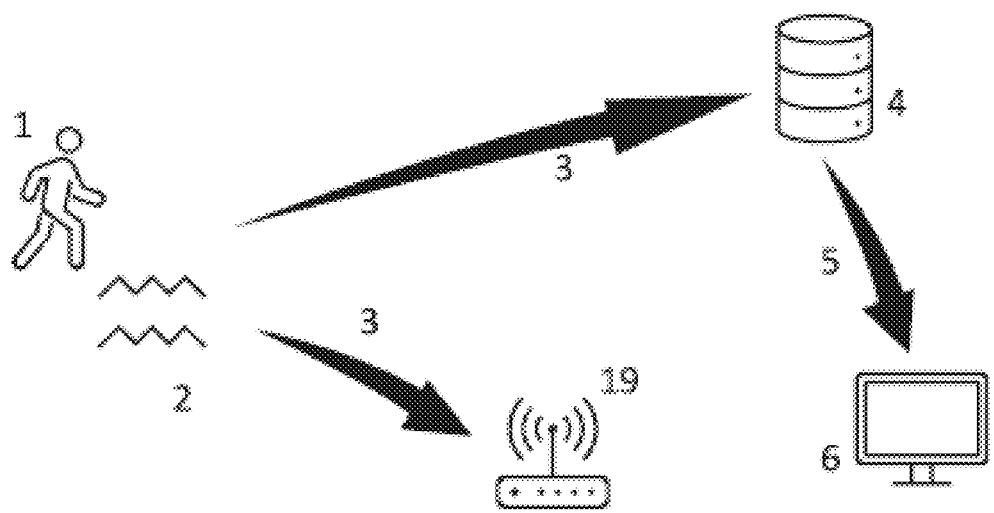
FIG. 1 is a schematic view of the operational arrangement of this innovation, where one can see the passer-by (1), the sensing device (2), the captured information (3), the activated device (19), the server (4), the generated data (5), and visualization (6).

The operating logic of this innovation's system, shown in FIG. 1, is based on detecting the displacement of the passers-by (1) along the device (2), when the conductive polymer ribbons (7) are pressed and, when contact with the metallic base (12), form an electrical circuit that changes its resistivity, thus, transmitting a sensitivity to pressure as a captured signal, representing a compression line of the footprint (8) formed by the passers-by step (1). Thus, the size of this footprint (8) and its displacement direction can be estimated, through the dynamic variation of this compression line, and the estimated total weight.

The sensing by the compression (8) from walking on the device (2), in particular on the conductive polymer ribbons (7), is given by the spatial reading, performed by an electronic scan, similar to reading a written word, where each letter is interpreted by joining them in a pre-established sequence and generating information (3) that can be understood, translated, analyzed, transmitted and stored.

Figure 2:
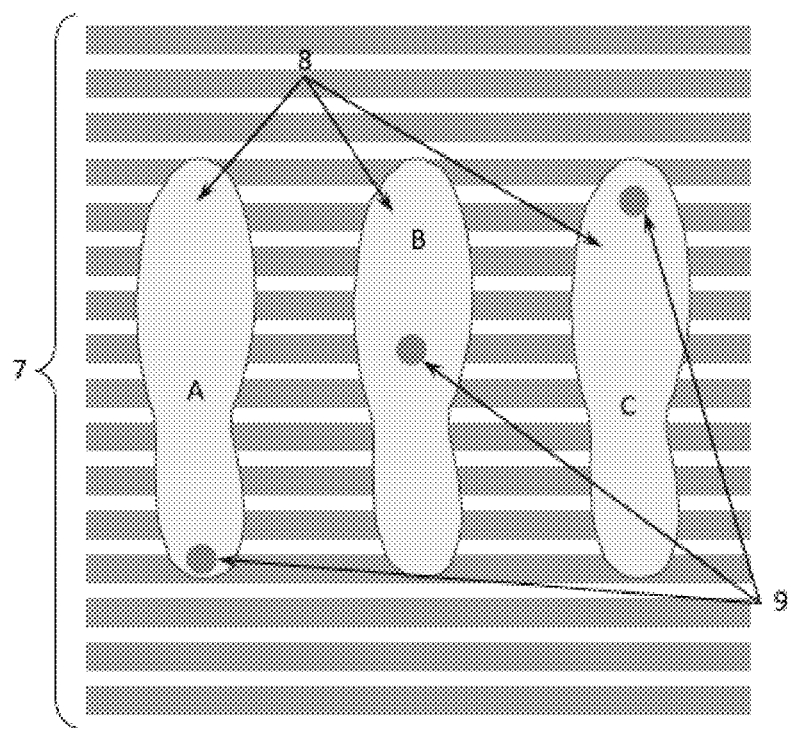
FIG. 2 is a schematic representation of the operation of this innovation, where you can see the footprints (8A, 8B, 8C) on the parallel ribbons (7) and the pressure points (9).
Figure 3:
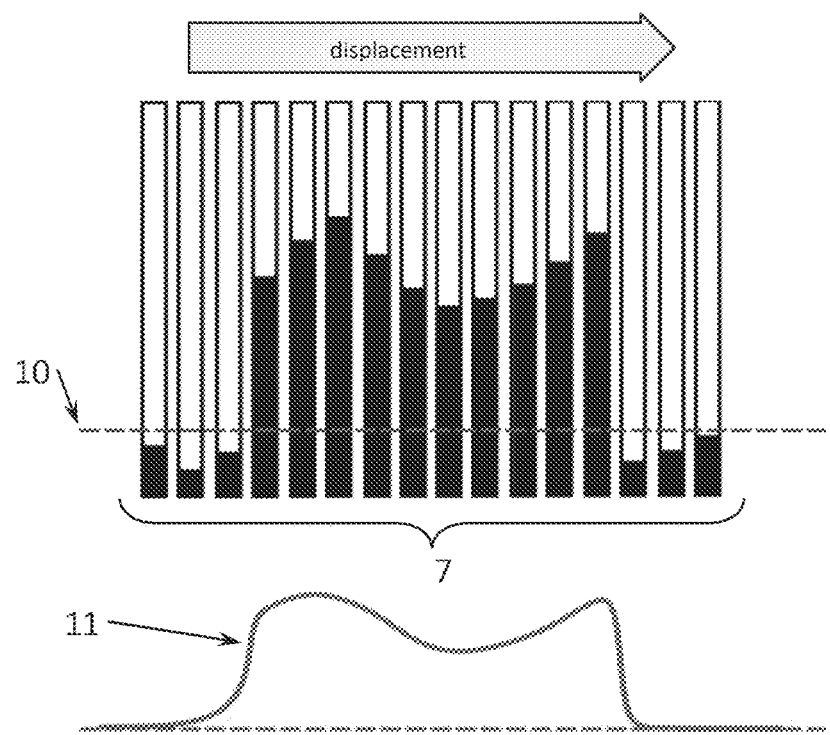
FIG. 3 shows the formation of the "resistivity variation curve" (11) with a dynamic "off-set" (10) from the displacement reading along the ribbons (7).

The device scanning (2) takes place from one end to the other, towards displacement direction, as illustrated in FIGS. 1, 2 and 3, where the polymer ribbons (7) placed on the electrically conductive metal bars (12) and arranged transversely to the displacement direction of the passer-by (1), are electrically isolated from each other by a separator (13, 17) which can be constituted by a common insulating rubber or another equally functional element. The electronic device used for this scan is a digital MUX/DEMUX, embedded to the electronic circuit (14), which can be 16×1, 32×1, 64×1, and so on, depending on the length of this mat (2).

This electronic circuit (14) translates into a "chip" already well known and documented within the electronics of components called "integrated circuits". In the configuration represented herein, a C-MOS technology, called 4067, or similar ones, derived from the type of transistors used for the function, which is a bilateral switch of 16 positions for 1 channel, is used. These positions are controlled by a 4-bit binary coding digital signal commanded by a programmable microcontroller (14), with integrated IoT features.

Thus, each of the bars (12) and each of the transverse ribbons (7) is connected to one of the terminals of this electronic circuit (14), as illustrated in FIG. 5, so that the scan is carried out by measuring the resulting resistivity of the ribbon (7) over each of the bars (12). These values are read by an ADC (Analog to Digital Converter), existing within the electronic circuit itself (14), and stored individually in a memory area (variable type "array") in numerical form, constituting the very processing system integral to the electronic circuit (14). At each scanning, new values are stored in this numerical memory to be processed afterwards.

As these readings take place sequentially (the scanning itself), some data is obtained from this footprint (8), such as morphology, intensity and direction. Considering a common stride, by the movement of the feet (8), a pressure diagram on the mat (2) is obtained, as shown in FIG. 2, in an illustrative example of a device (2) with 16 ribbons (7).

In this stride, at first, the footprint (8A) has a pressure point (9) closer to the heel, which is the pressure point of the foot (8) while walking. As the movement continues, the pressure point (9) changes to the midpoint of the foot (8B), going to the tip of the foot (8C). In other words, the pressure (9) on the ribbons (7) moves along the footprint (8A, 8B, 8C).

Thus, in the scanning system with 16 ribbons (7) of the preferred configuration shown herein, the stratified reading along the ribbons (7), illustrated in FIG. 3, allows the construction of a graph representing the "resistivity variation curve" (11) with the dynamic "off-set" (10) from the displacement reading along the ribbons (7). This dynamic "off-set" (10) is an initial marking value, obtained by the average given by successive readings carried out at "no load", that is, no weight applied. This numerical value is unique for each ribbon (7) of the sensing component; therefore, it consists of a numerical value that can be represented by a numeric matrix with one row and the number of columns equivalent to the number of ribbons (7). Successive averages are renewed and new values compose this numeric matrix while the mat (2) remains on standby for a new passer-by (1).

In this graph, we see the resistivity variation [f(x)] forming the curve (11). So, to calculate the passer-by weight (1), this curve area (11) can be related as:

$$\text{Weight} = K \cdot \int f(x) \cdot dx$$

Where K is the constant that relates the total resistivity to the weight force applied by the mass in kilograms (kg).

In the case illustrated herein, with 16 ribbons (7), the 4th ribbon is the first to feel the compression and the 13th ribbon is the last, thus defining the footprint (8) in its direction and size. Considering that the scanning takes place upwards, that is, from ribbons (7) 1 to 16, and the position of the mat (2), in the upward direction being the same as the entrance to the establishment, it is defined that a person (1) would be walking towards the entrance. Furthermore, the size of this footprint (8) can be estimated by calculating the sum (integration) of mechanical compression on each ribbon (7), the weight of the passer-by (1).

A bare foot step (8) is certainly not considered herein, so the size of the foot can only be estimated due to the most diverse types of shoes. Just as the weight can also only be estimated since the passer-by (1) is clothed and wearing shoes and also carrying some significant extra weight in their hands, such as bags, a baby, or a child, etc.

The electronic circuit (14) comprises a programmable microcontroller with IoT features, which is used to command the MUX/DEMUX device, addressing it to make the individual scanning of each transverse ribbon (7) and store them for later processing and sending to a data network server (14) or to the activated device (19), within the IoT connectivity environment.

Figure 7:
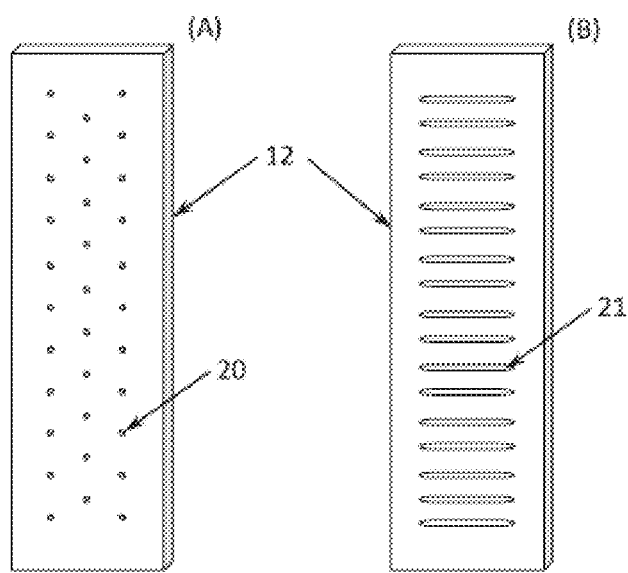
FIG. 7 schematically represents the configurations of the gaps in anodizing for contact with the metal surface, where you can see the conical cavities (20) and grooves (21) in the two modes (7A and 7B) discussed herein.

The assembly of the device (2) comprises the insertion of the ribbons (7), which work as mechanical compression sensors, between the upper coating of the device and the metal structure (12), overlapping each bar (12) individually. Preferably, this base (12) is made of anodized aluminum with gaps in the anodizing layer, such as grooves (21) or conical cavities (20), as illustrated in FIG. 7.

These gaps are intended to allow the contact of the ribbon (7) with the metal surface of the bar (12) free of protection, so that the ribbon (7) accommodated on the bar (12) can close the contact with the metallic surface when pressed and return to its original position when the pressure is removed, in its elastic characteristic.

The resistivity conversions, now demultiplexed, to numerical digital information is done by the electronic circuit itself (14), which has analog-to-digital converters (ADC) already included in its building.

Data connectivity is what makes this mat (2) an IoT device, in the case in question, with Wi-Fi access to a nearby router, access to a network server is channeled (4). The final purpose of this system is to load this server (4) with information on the time of scanning (3) and data (5) from the measurements taken, as well as allowing interaction with an activated device (19).

Several data exchange protocols can be used, in particular MQTT (Message Queuing Telemetry Transport), very light and suitable for sensors and small devices, optimized by TCP/IP networks, making use of a minimum data bandwidth network, with good reliability and a good level of guarantee of data delivery and receipt. In addition, it requires low energy consumption, extending the useful life of the batteries.

Thus, this innovation's system has some advantages compared to existing solutions. The first advantage is the ability to scan several IoT devices (2) simultaneously, connected to a data network server (4), which allows taking actions given the set of data (5) obtained. Thus, the resulting work can be done by collecting data (5) from the many mats (2) installed in the same place, for example, in the different accesses to a shopping center. Therefore, this is not a product that works alone, for a single purpose, it allows the interconnection of many others so that, together, they can produce relevant information for a broad environment, with multiple purposes.

The second advantage of this innovation is its broader applicability in relation to similar products. This occurs through the technique of capturing the footprint morphology (8) and its dynamics applied on the mat (2) during the stride (8A, 8B, 8C). Thus, in addition to counting passers-by (1), it is possible to determine their displacement direction, the size of their feet and their estimated body weight. Crossing these data (5) determines a wide variety of applications when they move from the device (2) to a network server (4) with good storage, processing, management and distribution capacity.

This advantage is due to the sensing by ribbons (7) set transversally to the displacement direction, which are scanned, not making a distribution of mechanical compression point sensors as in similar projects, but with planar sensors that meet a determined area given by the width of each transverse ribbon (7). Even if captured in a single dimensional manner, the scanning of this system can be expanded into a two-dimensional capture, such as a 16×16 scan, for example.

The third advantage is due to the wide functionality of IoT devices (2) when interconnected with each other, such as, for example, turning machines or equipment on or off (19) according to the transit on the mat (2), weight and displacement direction. You can adjust the intensity of lighting according to the compression applied, turning on lights in a garage when, in the dark, someone steps on the device to get in, and turning them off when leaving. Machines presenting some risk of accident can be turned off when approaching a person or even an object passing over the mat (2). It is possible to set off an alarm and get a notification on the phone when someone weighing more than a certain limit steps on the mat (2), preventing pets from activating this alarm.

This innovation is not limited to the representations commented or illustrated herein, and it must be understood in its broad scope. Many modifications and other representations of the invention will come to the mind of those skilled in the art to which this innovation belongs, having benefited from the teaching presented in the foregoing descriptions and accompanying drawings. Furthermore, the invention is not limited to the form specifically disclosed, and modifications and other forms are intended to be included in the scope of the appended claims. Although specific terms are used herein, they are used only generically and descriptively, not being intended as a limitation.

The invention claimed is:

1. A system for capturing and processing information from passers-by comprising:
   at least one device with stratified mechanical compression sensing equipped with an electronic circuit that captures signals generated by steps of the passers-by on the device,
   a plurality of metal bars located on each one of the at least one device, the plurality of metal bars are electrically isolated from each other,
   an insulating separator placed between each one of the plurality of metal bars, the insulating separator is made of non-conductive material,
   a ribbon superimposed into each one of the plurality of metals bars, the ribbon is made of a conductive polymer material,
   the electronic circuit is connected to each one of the plurality of metal bars, each one of the metal bars is individually connected to the electronic circuit, the electronic system process generates information and sends the information through a wireless communication network to a remote server, the remote server generates data on said passers-by, or activates other devices inside a building,
   a malleable and resistant coating located on a top surface of each at least one device,
   wherein when the ribbons are pressed, the metal bars transmit a signal to the electronic circuit and the electronic circuit captures and sends the information to the remote server, and
   wherein the at least one device is a mat or a door mat.

2. The system according to claim 1, wherein:
   said plurality of metal bars are set transversally to a displacement direction, along the device.

3. The system according to claim 1, wherein the insulation separator includes a separator and a cable both made of an insulation material.

* * * * *